M. W. HOUSE.
Electrical Bath.
No. 1,386. Reissued Jan. 13, 1863.
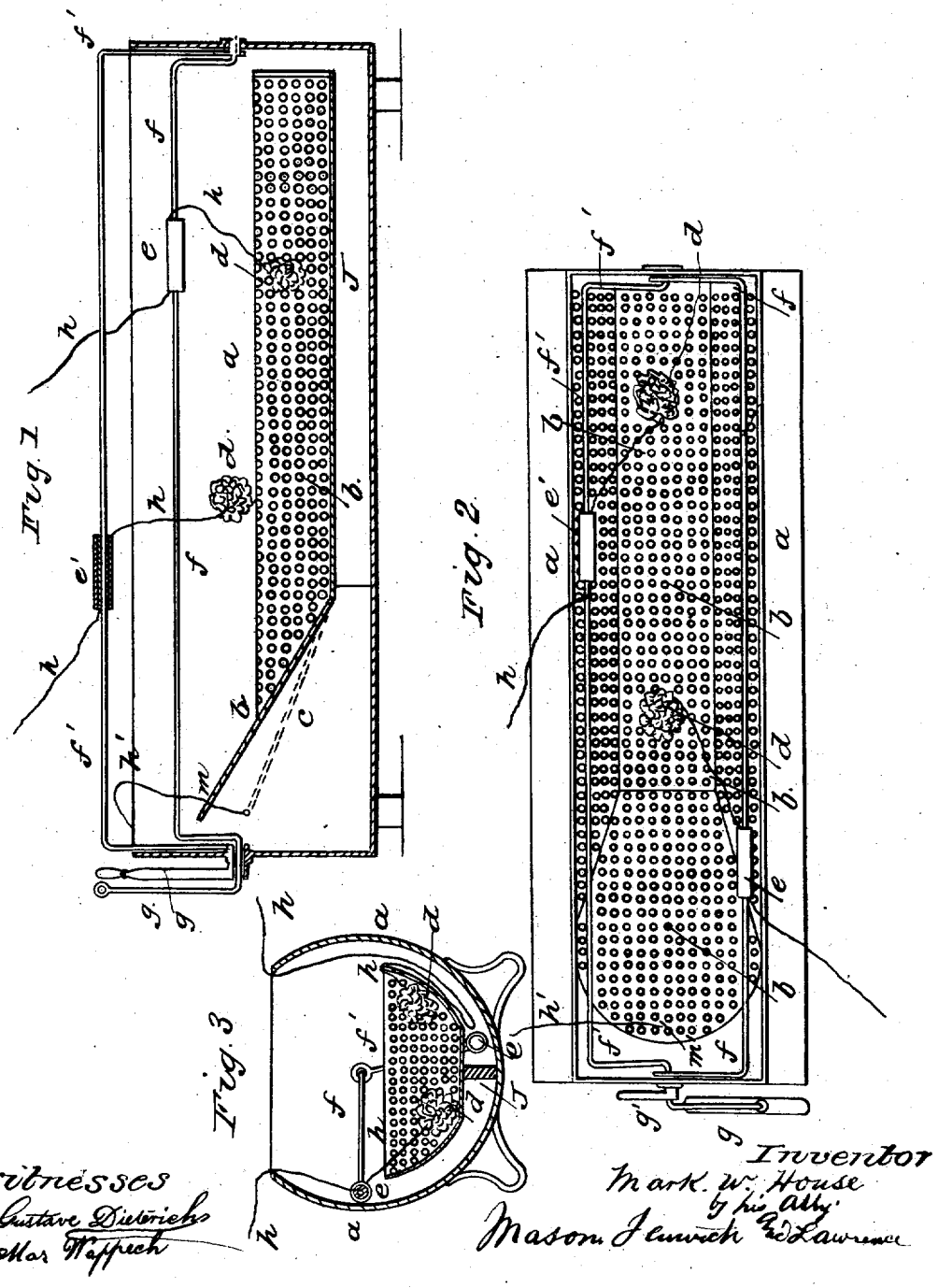
N. PETERS, Photo-Lithographer, Washington, D. C.

UNITED STATES PATENT OFFICE.

MARK W. HOUSE, OF CLEVELAND, OHIO.

IMPROVEMENT IN ELECTRIC BATHS.

Specification forming part of Letters Patent No. 34,425, dated February 18, 1862; Reissue No. 1,386, dated January 13, 1863.

*To all whom it may concern:*

Be it known that I, MARK W. HOUSE, of Cleveland, in the county of Cuyahoga and State of Ohio, have invented certain improvements in the apparatus through which to apply electricity in the healing art; and I do hereby declare the following to be a correct description of the same, reference being had to the accompanying drawings, in which—

Figure 1 is a longitudinal section of my improved bathing-tub. Fig. 2 is a horizontal projection; Fig. 3, a transverse section of the same.

My apparatus is intended to be used generally in connection with a water-bath; but it can, when desirable, be used for applying electricity only to the body of the patient without the presence of water. When water is used it must never rise as high as the centers on which the arms *f f'*, hereinafter to be described, are made to revolve.

The object of my invention is to provide for a more perfect control of the electric current, so that it may be directed through any part of the person who is to be subjected to its action.

In Figs. 1, 2, and 3, *a a* is the bath-tub, which I generally make of cylindrical form, though it may be made in any other convenient shape.

*b b* is a tray, made of net-work or some perforated material, and supported by some non-conducting material J. Upon this tray the person is to rest while in the bath.

*f f f' f'* are arms which revolve around the centers at each end of the bath. Each of these arms can be rotated freely around its centers of motion without disturbing the other; but it will be seen that they cannot make a complete revolution on account of the insulating-support J.

*e e'* are metallic conductors insulated from the arms *f f'*, along which they freely slide.

*h h h h* are wires connecting with the proper poles of the battery and placed in electrical communication with the conductors *e e* and with the sponges *d d*, but insulated from the arms *f f f' f'*.

*h' h'* is a wire or other flexible conductor, connecting one of the poles of the battery with the plate *c*, which is constructed of some good conducting metal and hinged to the non-conducting support J, so that it may be raised to any desirable degree of proximity to the inclined portion of the tray *b b*, upon which the head of the patient is intended to rest when in the bath. The object of this plate *c* is to increase or diminish at pleasure within certain limits the quantity of the current of electricity passing upon the head and neck of the patient.

It is evident, that if the body of the bathing-tub *a a* is constructed of metal or other conducting substance, the conductors *e e'* and the wires *h h h' h'* must be so arranged or managed that actual contact of any of these parts with the said bathing-tub must be entirely avoided. The wire *h' h'* must also be prevented from coming in contact with the tray *b b'* when the latter is constructed of any conducting substance. For this purpose a thimble of gutta-percha or other non-conducting substance is interposed between that wire and the tray through which it passes, as is shown at *m m*.

The manner of using the above-described apparatus is evident from the description already given. By seizing the conductors *e e'*, one in each hand, or by bringing them respectively in contact with any other portions of the body, the current of galvanic electricity can be made to pass through the person of the patient in many directions, and by wetting the sponges *d d* to render them good conductors, and by moving them with instruments having insulating-handles, such current may be made to pass through any portion whatever of the external surface of the body.

What I claim as my invention, and desire to secure by Letters Patent, is—

1. The combination of the tray *b b* with the longitudinal insulator J, for the purpose described.

2. The combination of the tray *b b*, or its equivalent, with the head-plate *c*, whereby the quantity of electricity may be regulated, substantially as and for the purpose described.

3. The traveling movable poles or electrodes *e e'*, working on arms *f f*, or their equivalents, when those arms are movable, substantially as described.

4. The movable poles *e e*, with the sponges *d d*, when arranged in such a manner that they can be freely changed or rotated on all sides of the patient, except as limited by the support J, causing the electric current to pass in any given direction or through any part of the patient's body in the way substantially above set forth.

MARK W. HOUSE.

Witnesses:
A. S. WHEELER,
ALFRED ELWELL.